Patented Oct. 20, 1931

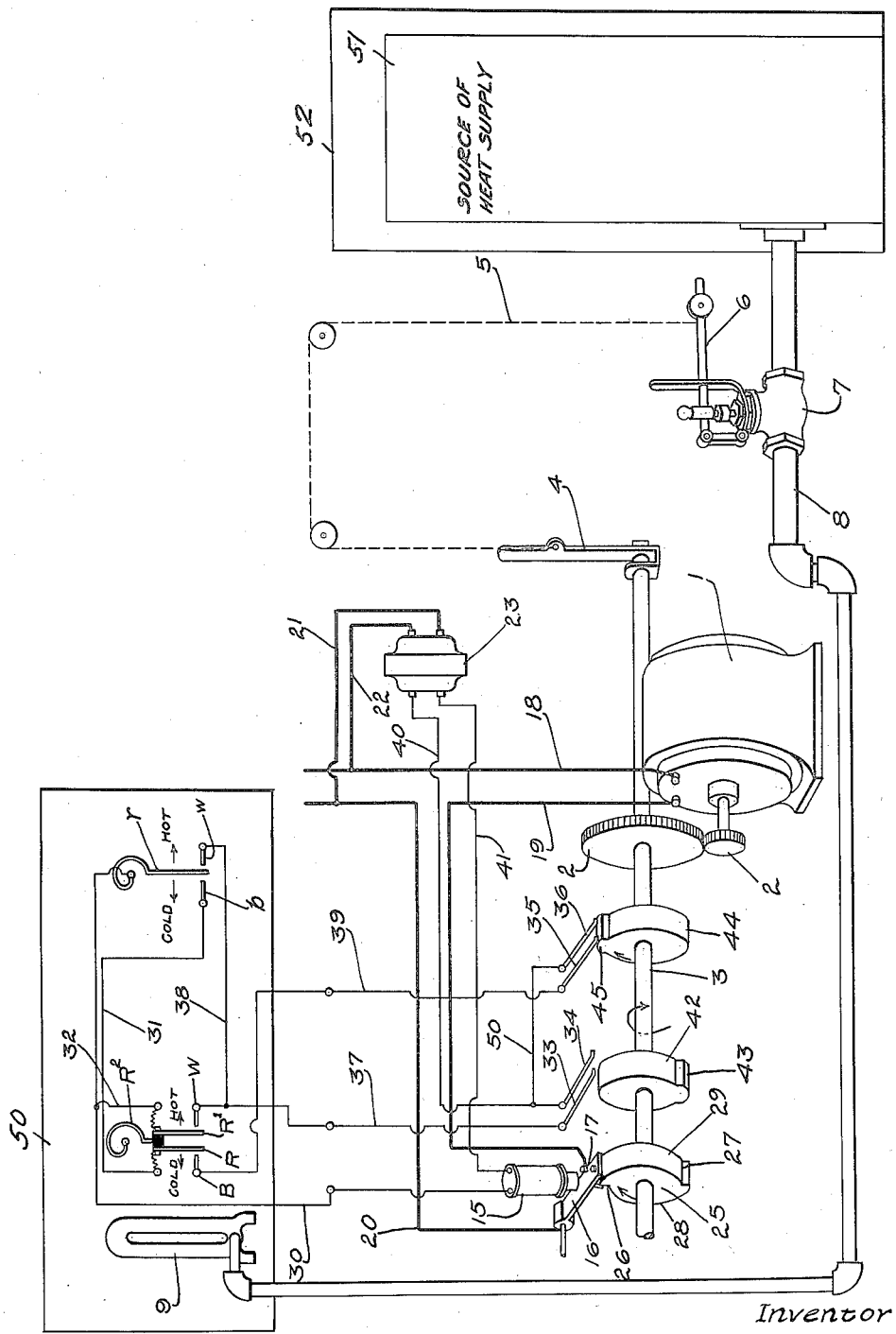

1,828,553

UNITED STATES PATENT OFFICE

WILLIAM ELLISON WORTH, OF NORTH PELHAM, NEW YORK, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

HEAT REGULATING DEVICE

Application filed September 10, 1927. Serial No. 218,836.

This invention relates to means for regulating heating systems in a manner to permit at least two thermostatically responsive devices, which are submitted to different degrees of temperature or have different lags, to cooperate for controlling heat supply to a heating device or devices, so that either or all of the devices can assume control of the mechanism.
Objects of the invention are to provide means operable independently of a master or room thermostat of a heating system to separately, and under certain conditions, dominantly, control, heat control mechanism in such a manner that the heat at a point of delivery in the room can be discontinued at the end of any preferred and predetermined time interval or intervals conformably to temperature variations of any magnitude or duration; to provide devices automatically operable as the result of temperature fluctuations at different places to alternately supply and interrupt the supply of heat, to the device or devices to which the heat is delivered from a heating plant; to provide means for timing the interval between the opening and closing of a control valve so that the heater is not allowed to cool over too long a period, or under other conditions, is not allowed to receive heat over too long a period; and additionally to provide means accomplishing the above results in such a manner that either two or more devices can operate to interrupt the heat supply, but permitting the heat supply to be resumed or continued only when both devices have reached a predetermined temperature.

Features of the invention include the idea of the use of at least two thermostatic devices, one of which is arranged nearer the heater device than the other, or in which the devices have different lags; along with all the details of construction, including combinations and sub-combinations of the elements.
Features and advantages of the invention will be also set forth in the description of the drawing forming a part of this application, and said drawing illustrates one application of the invention. The parts show a condition in which the heat supply to the radiator is interrupted.

The present device, illustrative of one application of the invention, comprises a motor 1 and meshing gears 2 respectively carried by a shaft 3 and the motor shaft. A lever 4 is attached to the shaft 3 and is connected by a flexible element 5 with a weighted valve lever 6, controlling valve 7, in turn controlling heat supply through the pipe 8 to a heater 9.

A relay is employed. The numeral 15 indicates its coil, and the numeral 16 its armature. This armature acts as a switch closing against a contact 17. This relay or relay-switch controls current to the motor 1. One of the motor lines is indicated at 18 and the other at 19, this latter line being connected with contact 17. The opposite side 20 of the line 19 is connected at the opposite side of the switch 16. The branch lines 21 and 22 connect with the primary of the transformer 23. A cam or equivalent device 25 carried by the shaft 3 has depressions 26—27 to permit automatic opening of the switch 16 after de-energization of the coil 15. The cam also provides peripheral portions 28—29 lying between the depressions 26—27 and these peripheral portions act to mechanically hold the switch 16 for certain periods substantially corresponding respectively to the opened and closed positions of the valve 7. It will be understood, that in this instance, the switch 16 is permitted to open both when the valve is fully closed, and when fully opened.

Adjacent the radiator is a thermostatic device comprising a thermal element $R^2$ carrying insulated contact members respectively designated R and $R^1$, these contacts being respectively alternately engageable with corresponding contacts B and W.

It is assumed for illustrative purposes, that this device is placed one foot above the radiator, the radiator will be at 212° when under full steam or heat supply. It is also assumed, for example, that the device will reach a temperature of 126° and close on the hot side, when the radiator is at 212°. It is also assumed that the contact points of the thermostatic device are set for a lag, for example, of 26°. This arrangement will allow the radiator to cool to 100° before a call for heat is made, or before contacts R and B engage. It is to be understood that any desired lag can be obtained by properly spacing the contact B—W respectively relative to contacts R—R', or by increasing or decreasing the distance between the heater and the control device.

A room or master thermostat or other similar device suitably placed, has the thermostatic element $r$ operating between contacts $b$—$w$. We will assume this instrument set for operation between temperatures of 70° and 72°, and, therefore, to have a lag of 2°.

Conductor 30 connects the coil 15 with the thermostatic element $r$, and a branch conductor 32 connects conductor 30 with the element $R^1$ of the radiator or heater device. Conductor 31 connects contact element R with the contact element $b$, of the master or room device. Switch elements 33—34 are arranged to be electrically connected by projection 43 of the cam 42 of the shaft 3. Elements 35—36 are arranged to be electrically connected by projection 45 of cam 44 of shaft 3. The controlling portions of these cams occupy, in this instance, a diametric relation, corresponding to a similar relation of the depressions 26—27 of cam 25. The arrangement is such that when one cam is closing its circuit the other is farthest from circuit closing position.

Element 33 is connected by conductor 37 with contact W, and conductor 37 is connected by conductor 38 with contact $w$. The element 34 is connected by conductor 40 with one side of the secondary of the transformer. Element 35 is connected by conductor 39 with contact B. Element 36 is connected by conductor 50 with conductor 40. The opposite end of the coil 15 is connected by conductor 41 with the opposite side of the secondary transformer.

*Operation*

Suppose the temperature of the radiator device to have fallen to 100°, and that contact has been made between R and B. This conditions the relay circuit for energization of the relay coil 15 to close the main switch and start the motor, as soon as the room or master thermostat has cooled sufficiently to cause $r$—$b$ to make contact. This making will, we have assumed, take place at 70°. Until this contact does take place, however, no energization of relay can be had. That this is true is seen by tracing a circuit from one side of the transformer through conductor 41, coil 15, conductor 30 to element $r$. If $r$ is not contacting with $b$, then current cannot pass through conductor 31 to element R, and thence by way of element B, conductor 39, switch elements 35—36, conductor 50, conductor 40 to the opposite side of the transformer. Thus it will be evident that both thermostatic devices must call for heat or be sufficiently cold, before the motor can be operated to open the valve and supply heat. However, when $r$ and $b$ do make, the coil 15 is energized, the shaft 3 is caused to rotate and the valve begins to open and, in this instance, is completely opened after the shaft has traveled through an arc of 180°. During the first few degrees of movement of the shaft, contact between switch elements 35—36 is broken, and current to coil 15, interrupted. The element 16, however, is mechanically held closed by one of the surfaces 28 or 29. If the device starts from its position shown in the drawing the surface 28 will act to mechanically hold the element 16 after it is magnetically raised to circuit closing position. Near the end of the rotative cycle of the shaft, the element 43 electrically connects elements 33—34, thus conditioning the relay circuit to be closed, when contact at either thermostatic device is made, as a result of sufficient heating.

The device is now conditioned for operation to close the steam valve as soon as the temperature rises sufficiently. This can be accomplished, as will be seen by the thermostatic control device acting either independently or in unison. That thermostatic device which first heats sufficiently will assume control to close the valve. Suppose the temperature of the radiator device, to raise to 126°. The result will be that element R'—W will make contact, resulting in the energization of the relay, and subsequent valve closure. Here it will be seen that the radiator thermostat assumed control to close the valve. However, although the radiator device has operated to shut off the supply of heat, the temperature at the master thermostat may not have risen to its maximum of 72°. The radiator will, therefore, begin to cool, while the element $r$ of the room or master thermostat is in contact with $b$. When the radiator has cooled sufficiently, contact will be made between R and B and the valve will again be opened. This opening and closing of the valve as the result of operation of the radiator device will gradually build up the temperature until contact between $r$ and $b$ is broken, and then regardless of the temperature at the radiator, the master or room thermostat may assume control and shut off the supply of heat. That this is true can be seen by tracing the circuit as follows: transformer, conductor 41, coil 15, conductor 30, element $r$, contact $w$, conductors 38—37, switch elements 33—34, conductor 40 to the opposite side of the transformer.

It will be therefore noted that the heat supply can be interrupted as the result of the operation of either of the thermostatic devices, and each can operate independently of the other to obtain this result. The result is that heat is intermittently supplied to the radiator as the result of operation of the radiator thermostat, until a sufficient amount of heat has been supplied to cause the room or master thermostat to assume control to shut off the supply of heat, regardless of the temperature at the radiator. However, in order that the valve may be opened as the result of a call for heat at the room thermostat, the radiator thermostat must necessarily be closed or be making at R—B. As before stated, in this case the steam valve is caused to open, heat builds up at the radiator and eventually contact is broken at R—B and made at R'—W, which latter contact will cause a second operation of the motor to close the valve.

The relay is alternately energized, firstly, only when both of the thermostatic devices are sufficiently cold, secondly, when either thermostatic device is sufficiently hot. The first energization results in opening of the steam valve and a supply of heat to the radiator, while the second energization results in closing of the valve and the discontinuance of the supply of heat to the radiator.

The main switch cam 25, operates to hold the switch mechanically closed after de-energization of the relay, and afterwards to release the switch for automatic opening, after a predetermined period, in this instance, whenever the valve is fully opened or fully closed. The other cams act to alternately open and close their circuits to the relay and thermostatic devices, so that one cam closes its circuit to condition it to permit energization of the relay on a call for heat, and the other closes to condition the circuit for energization of the relay upon a call for less heat. The arrangement of these cams in relation to the main switch control cam is such that whenever this main switch cam is positioned to permit automatic opening of the main switch, either one or the other cam is closing its circuit or conditioning its circuit for the purposes above mentioned.

The numeral 50 indicates an enclosure in which the radiator, as a point of delivery of the heat, is located along with the two thermostatic devices which are exposed in different degrees to the heating effects of the radiator. The numeral 51 indicates a source of heat supply such as a furnace and the numeral 52 an enclosure such as a cellar containing this heating plant or source.

I claim as my invention:

1. A system including a furnace, a radiator, pipe connections for delivering heat from the furnace to the radiator, a valve for controlling heat supply through the pipe, a plurality of thermostatic devices placed at different distances from the radiator and both adapted to be affected by heat delivered by said radiator, and means for controlling said valve by said thermostatic devices to control radiator temperature independently of the temperature of the source of heat supply, so that both thermostatic devices must be sufficiently cold to close in order to open the valve and so that when either thermostatic device is sufficiently hot the valve is closed and so that that thermostatic device nearest the radiator can obtain opening and closing of the valve when the other thermostatic device is sufficiently cold to close.

2. A system including a furnace, a radiator, pipe connections for delivering heat from the furnace to the radiator, a valve for controlling the supply through the pipe connection, a plurality of thermostatic devices one of which is placed adjacent the radiator, and another more remote therefrom but both adapted to be affected by heat delivered by said radiator, and electrical and mechanical means for controlling said valve, including circuits which are controlled by said thermostatic devices, so that the thermostatic device nearest the radiator can obtain opening and closing of the valve when the other thermostatic device is sufficiently cold to close, and so that both thermostatic devices must be sufficiently cold to close in order to open the valve, and so that when either thermostatic device is sufficiently hot the valve is closed.

3. In combination, an enclosure having a furnace therein, a second enclosure, having a radiator therein, piping connecting the furnace with the radiator, a valve in the piping, means for controlling the valve including a thermostatic switch disposed adjacent the radiator, a second thermostatic switch in the same enclosure with the radiator but more remote therefrom, and mechanical and electrical means for controlling the valve, including electrical circuits between the thermostats and mechanical means such that the thermostat nearest the radiator can alternately obtain an opening and closing of the valve while the other thermostatic device is sufficiently cold to close, and such that both thermostatic devices must be sufficiently cold to close in order to open the valve and such that when either is sufficiently hot the valve is closed.

4. A device of the class described comprising a space to be heated, a source of heat supply external to the space to be heated, two thermostats directly responsive to the changes in temperature of the air in the space to be heated, heat radiating means supplied by the heat source and so placed as to affect one of said thermostats more than the other, and means adapting said thermostats to control said heat source to obtain production of heat when both thermostats are sufficiently cold, and to prevent further production of heat when either thermostats is sufficiently hot.

5. A space to be heated, a steamheating system having a heat generating device which is external to the space to be heated, two thermostats directly responsive to the changes in temperature of the air in the space to be heated, heat radiating means supplied by the generator and so placed as to affect one of said thermostats more than the other, and means adapting said thermostats to control said heat source to obtain production of heat only when both thermostats are sufficiently cold and to prevent further production of heat when either thermostat is sufficiently hot.

In witness whereof, I have hereunto set my hand this 31 day of Aug., 1927.

WILLIAM ELLISON WORTH.